(12) United States Patent
Wang et al.

(10) Patent No.: US 12,554,771 B1
(45) Date of Patent: Feb. 17, 2026

(54) VIDEO FILTERING OBJECT EXTRACTION AND APPLICATION VIA LARGE LANGUAGE MODEL

(71) Applicant: Matroid, Inc., Palo Alto, CA (US)

(72) Inventors: Huaijin Wang, Redwood City, CA (US); Alexander Jordan Bildner, San Francisco, CA (US); Amey Patel, Mountain View, CA (US); Andrew Ellison, Newark, CA (US); John Goddard, Palo Alto, CA (US); Ryan Wong, Palo Alto, CA (US); Darin Tay, Palo Alto, CA (US); Reza Bosagh Zadeh, Palo Alto, CA (US)

(73) Assignee: Matroid, Inc., Palo Alto, CA (US)

( * ) Notice: Subject to any disclaimer, the term of this patent is extended or adjusted under 35 U.S.C. 154(b) by 0 days.

(21) Appl. No.: 19/012,229

(22) Filed: Jan. 7, 2025

(51) Int. Cl.
*G06F 16/70* (2019.01)
*G06F 16/735* (2019.01)
*G06F 16/738* (2019.01)
*G06F 16/783* (2019.01)

(52) U.S. Cl.
CPC .......... *G06F 16/735* (2019.01); *G06F 16/738* (2019.01); *G06F 16/7837* (2019.01)

(58) Field of Classification Search
CPC ... G06F 16/735; G06F 16/738; G06F 16/7837
See application file for complete search history.

(56) References Cited

U.S. PATENT DOCUMENTS

| 11,468,677 | B2 * | 10/2022 | Zadeh | G06F 16/738 |
| 12,248,467 | B1 * | 3/2025 | Pendar | G06F 16/243 |
| 2023/0205817 | A1 * | 6/2023 | Janakiraman | G06N 20/00 |
| | | | | 707/722 |

* cited by examiner

*Primary Examiner* — Kristopher Andersen
(74) *Attorney, Agent, or Firm* — Fenwick & West LLP

(57) ABSTRACT

Described herein are systems and methods that detect and filter objects from media content. In particular, a detection system accesses classifiers that can detect objects when applied to a video. The detection system receives a text input from a user interface identifying filtering criteria for outputs of the classifiers and inputs the filtering criteria to a filtering language model that produces a filtering object. The detection system presents the filtering object at the user interface. In response to a user accepting the filtering object, the detection system applies the classifiers to the video, which produces a set of detected objects. The detection system applies the filtering object to the detected objects by removing a subset of the detected objects that do not satisfy the filtering criteria and presents the video with the filtered set of detected objects highlighted within the video.

19 Claims, 11 Drawing Sheets

VIDEO FILTERING OBJECT EXTRACTION AND APPLICATION VIA LARGE LANGUAGE MODEL

BACKGROUND

1. Field of the Disclosure

This disclosure relates generally to detecting content in a media stream, and more specifically to applying machine-learning detectors to media streams to detect content in real-time.

2. Description of the Related Art

As the creation and sharing of digital media becomes more widespread, it becomes increasingly difficult to process the flood of information to find desired content. For example, the number of video files that are created and shared on the Internet have exceeded what can be manually reviewed by one or even a team of curators. However, conventional search engines are limited in their ability to search video content. Text-based search engines search for content using search strings that match text descriptors associated with media content. Often, text cannot accurately describe video content, and the search engine is unable to identify objects within the video based on text inputs.

SUMMARY

Described herein are systems and methods that search for visual features, such as objects, characteristics of objects, or actions done by objects, selected by users to find objects within media content items (such as videos or frames of video) and/or modify media content items based on detected visual features. As described herein, humans, objects, or other detectable visual features of a media content item are collectively referred to as "objects." Media content items may be recorded live (e.g., in real-time) or pre-recorded.

The systems employ language models and detectors to identify one or more objects in media content items, for example video stream data. The language models are configured to use text inputs to determine what object a user is looking for in a media content item or modification a user wants for the media content team. The objects, modifications, or other criteria determined by the language models may be input to the detectors. The detectors are configured to detect objects in media content and can be trained using a machine learned model (e.g., a convolutional neural network) as applied to a set of example media content items that include one or more objects of interest. The system provides user interfaces to a user interested in reviewing a media content item. The user interfaces are configured to allow users to review results of detection within or modification of media content items and input feedback regarding the detections and modifications.

In some embodiments, the system accesses one or more classifiers that can detect objects when applied to a video (or other media content item). The detection system receives a text input from a user interface. The text input identifies filtering criteria for outputs of the classifiers, and the system inputs the filtering criteria to a filtering LLM that produces a filtering object. The filtering object may be a representation of the filtering criteria. The system presents the filtering object at the user interface. In response to a user accepting the filtering object, the system applies the one or more classifiers to the video, which produces a set of detected objects. The system applies the filtering object to the detected objects by removing a subset of the detected objects that do not satisfy the filtering criteria and presents the video with the filtered set of detected objects highlighted within the video via the user interface.

In some embodiments, the system receives a text input that identifies a modification for a video stream. The system applies a modification large language model (LLM) to the text input, and the modification LLM extracts modification criteria from the text input. The system modifies a user interface to include a graphic object identifying the extracted modification criteria and modifies the video stream based on the extracted modification criteria to produce a modified video stream. The system 140 modifies the user interface to include the modified video stream. A user may interact with the user interface to produce more graphic objects and further modify the modified video stream.

In some embodiments, the system trains a detection neural network to identify objects within an image. The system receives a text input via a user interface requesting a search within the image and applies a search LLM to the text input. The search LLM identifies a target object associated with the requested search. The system applies the detection neural network to the image to identify instances of the target object. The system modifies the image to highlight the identified instances of the target object int eh user interface. The system receives feedback from the user interface modifying (e.g., moving, relabeling, removing, etc.) the highlighted instances of the target object and retrains the neural network based on the modified highlighted instances.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present disclosure can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

System Overview

Figure 1:
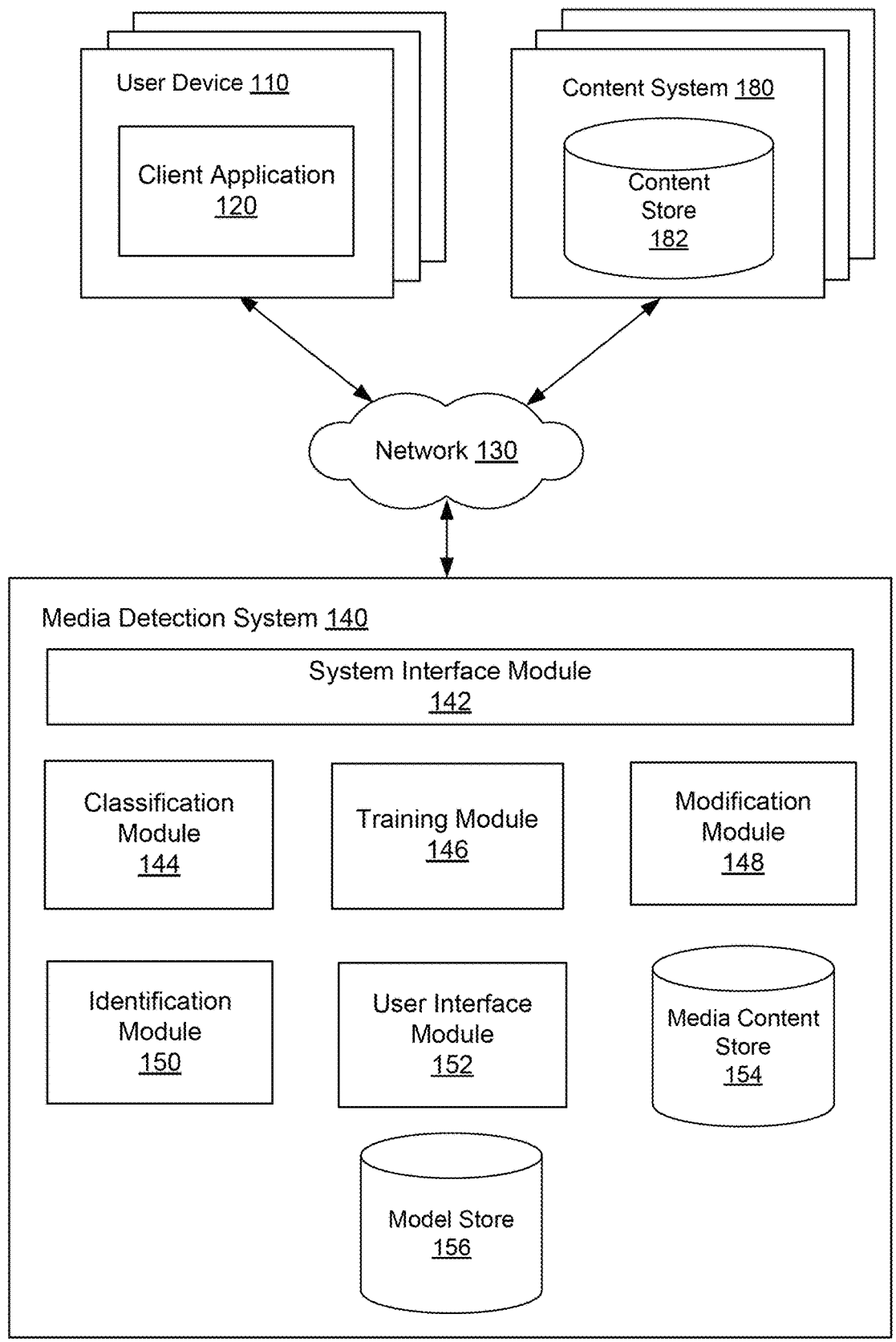
FIG. 1 is a block diagram of an overall system environment illustrating a media detection system, according to an embodiment.

FIG. 1 is a block diagram of an overall system environment illustrating a media detection system 140, according to an embodiment. The media detection system 140 uses large language models (LLMs) to determine what objects users want to search for in media content and how users want to modify media content. The media detection system 140 provides user interfaces that allow users to see objects requested via the text input, thus filtering the media content for the user in an efficient and simplified manner. The user interfaces also allow users see modifications made to media content and accept or reject the modifications. As shown in FIG. 1, the overall system environment includes the media detection system 140, one or more user devices 110, one or more content systems 180, and a network 130. Other embodiments may use more or fewer or different systems than those illustrated in FIG. 1. Functions of various modules and systems described herein can be implemented by other modules and/or systems than those described herein.

A user device 110 (also referred to herein as a "client device") is a computing system used by users to interact with the media detection system 140. A user interacts with the media detection system 140 using a user device 110 that executes client software, e.g., a web browser or a client application 120, to connect to the media detection system 140 (via the system interface module 142). The user device 110 displayed in these embodiments can include, for example, a mobile device (e.g., a laptop, a smart phone, or a tablet with operating systems such as Android or Apple IOS etc.), a desktop, a smart automobiles or other vehicles, wearable devices, a smart TV, and other network-capable devices.

The user device 110 can present media content provided by the media detection system 140 or a content systems 180. In some embodiments, the user device 110 includes an embedded video player such as, for example, the FLASH player from Adobe Systems, Inc., or any other player adapted for various media formats used in the media detection system 140.

A content system 180 is a computing system that generates and/or hosts media content. For example, the content system provides a media content hosting service that users can upload, browse, search for, stream, and/or play media content items. As another example, the content system 180 is a network video camera that captures images of its surrounding area and streams the captured content. The content system 180 may include a content store 182 that stores media content items.

The network 130 facilitates communication between the user devices 110 and the media detection system 140. The network 130 is typically the Internet, but may be any network, including but not limited to a LAN, a MAN, a WAN, a mobile wired or wireless network, a cloud computing network, a private network, or a virtual private network.

The media detection system 140 includes a system interface module 142, a classification module 144, a training module 146, a modification module 148, an identification module 150, a user interface module 152, a media content store 154, classification store 156, and model store 156, all of which are further described below. Other conventional features of the media detection system 140, such as firewalls, load balancers, authentication servers, application servers, failover servers, and site management tools are not shown so as to more clearly illustrate the features of the media detection system 140. The illustrated components of the media detection system 140 can be implemented as single or multiple components of software or hardware. In general, functions described in one embodiment as being performed by one component can also be performed by other components in other embodiments, or by a combination of components. Furthermore, functions described in one embodiment as being performed by components of the media detection system 140 can also be performed by one or more user devices 110 in other embodiments if appropriate.

The system interface module 142 coordinates communication between the user devices 110, the content systems 180, and the media detection system 140. For example, the system interface module 142 receives requests from the user devices 110 and interfaces with one or more other modules of the media detection system 140 to process the requests. The system interface module 142 also receives media content items from the user devices 110 and/or the content systems 180. The system interface module 142 transmits media content items and/or user interfaces to the user devices 110. As described herein, a media content item is a file (i.e., a collection of data) including media content such as pictures, videos, movie clips, games, soundtracks, and the like. The file can be various file formats. Although videos are used as examples to illustrate operations of the media detection system 140, this is done for the purpose of simplicity, and is not intended to be limiting in any way.

The system interface module 142 may process media content received from the user devices 110 and/or from the content systems 180. For example, the system interface module 142 assigns a unique media content item identifier to a media content item. The media content item can be identified by the unique media content item identifier. Other processing operations include, for example, formatting (e.g., transcoding), compression, metadata tagging, content analysis, classification/detection, and other data processing. The system interface module 142 may store a media content item in the media content store 154. The media content store 154 is a storage system where media content items are stored. A media content item may be associated with metadata such as a location (e.g., URL (Uniform Resource Locator)), a title, a descriptor, and the like. As further described below, the one or more media content items received from the user devices 110 may be used to generate filtering objects or may be modified based on inputs to a user interface.

The system interface module 142 interfaces with the content system 180 to process one or more media content items. For example, a user specifies a set of media content items for the media detection system 140 to process. The user provides locations such as URLs to the media content items in which the media detection system 140 searches for preferred media content. In some embodiments, the system interface module 142 obtains the one or more media content items from the content systems 180 and processes the obtained media content items locally. In some embodiments, the system interface module 142 interfaces with the content systems 180 such that the media detection system 140 can search for preferred media content in the media content items hosted by the content systems 180.

The classification module 144 detects visual features in media content items. In various embodiments, the classification module 144 detect visual features according to a user's specification. The user's specification can include a set of media content items. The set of media content items depict visual features, such as objects, characteristics of objects, or actions being performed by objects. The user may upload the set of media content items to the media detection system 140. Alternatively, the user may browse media content items stored in the media detection system 140 and select from among the browsed media content items. For example, the user can upload and/or select the set of media content items via one or more user interfaces provided by the user interface module 152. Via the one or more user interfaces, the user can also enter text inputs describing filtering criteria for what visual features the user wants to see via the one or more user interfaces.

The classification module 144 receives a media content item specified by a user from the user interface module 512. The classification module 144 accesses one or more classifiers in the model store 156. The model store 156 is a storage system where various models (e.g., classifiers, machine learning models, language models, etc.) and model-related data are stored. A classifier is an algorithm that determines a class of input data. Examples of classifiers include a support vector machine (SVM), Naïve Bayes model, logistic regression model, decision tree, random forest model, and a neural network such as a convolutional neural network (CNN) or recurrent neural network (RNN). A classifier can detect a visual feature when applied to a media content item. For example, a classifier may be trained to learn relationships between visual features of dogs such that the classifier, when applied, may categorize visual features shown in a media content item as a dog" or "not a dog."

The classification module 144 receives a text input from the user interface module 152. A text input is a textual description that identifies filtering criteria desired by a user. Filtering criteria are conditions used to filter visual features in media content items to focus on specific visual features that meet the conditions. For example, a text input may indicate to "detect all dogs," which represents a user's request that the classification module 144 find all dogs depicted by the media content item. In some embodiments, filtering criteria may specify time and space constraints. For example, a text input may indicate to "show dogs and cats within ten feet of one another" or to "only show cats detected five minutes after a previously detected cat." In some embodiments, filtering criteria may specify a relationship between two or more visual features in the media content item. For example, filtering criteria may specify to "only show frames with both a dog and a cat."

The classification module 144 applies a filtering LLM to the text input. The filtering LLM is a language model that employs deep learning techniques to understand text inputs and generate filtering objects based on user intents determined from the text inputs. Put another way, the filtering LLM is configured to learn patterns and structures inherent to language, such as grammar and context, which allows the filtering LLM to determine filtering criteria requested in text inputs and create corresponding filtering objects. The filtering LLM is stored in the model store 156 and may be trained by the training module 146, as described below.

A filtering object is used to filter visual features based on its corresponding filtering criteria. The filtering object may include a JavaScript Object Notation (JSON) or Structured Query Language (SQL) representation of the filtering criteria. For example, the filtering object may include the filtering criteria textually described in JSON or SQL. In some embodiments, the filtering object may include a simplified version of the JSON or SQL representation. For example, a simplified version may be a pseudocode (or "in layman's terms") version of the representation. The classification module 144 sends the filtering object to the user interface module 152.

In some embodiments, the filtering object may be associated with a confidence score described by the text input and generated by the filtering LLM in association with the filtering object. The filtering object may indicate the confidence score. For example, the text input "show me detections where the 'dog' confidence is more than 0.8" may result in a filtering object labeled with the text "label threshold filter: dog>=0.8." In some embodiments, the filtering object may be associated with an application order, which indicates where in an ordered set of filtering criteria the filtering criteria of the filtering object is to be applied. For example, the application order may indicate that the filtering criteria should be applied after a first filtering criteria but before any other filtering criteria, should be applied before a second filtering criteria, etc. The classification module 144 sends the filtering object to the user interface module 152 for presentation via a user interface.

The classification module 144 receives indications regarding the filtering object from the user interface module 152. The indications may denote an acceptance of the filtering object, rejection of the filtering object, and modification of the filtering object. An acceptance indication denotes that a user presented with the filtering object via user interface found the filtering object to accurately depict the filtering criteria she described in the text input. A rejection indication denotes that the user found that the filtering object was not an accurate representation of the filtering criteria.

In response to receiving an acceptance indication, the classification module 144 applies the one or more classifiers to the media content item. The classifiers detect visual features within the media content item. In some embodiments, each classifier may be configured to detect a particular visual feature. For example, a first classifier may be configured to detect dogs in media content items, a second classifier may be configured to detect cats in media content items, and a third classifier may be configured to detect the color blue in other detected objects. The classification module 144 applies the filtering object to the visual features detected by the classifiers such that the classification module 144 filters the detected visual features to remove detected visual features that do not meet the filtering criteria associated with the filtering object. For example, the classification module 144 may remove cats from the detected visual features based on filtering criteria that indicates to not detect cats. In another example, the classification module 144 may remove dogs that do not have spots from a set of detected dogs based on filtering criteria that indicates to only show dogs with spots. The classification module 144 sends the filtered set of detected visual features to the user interface module 152.

In response to receiving a rejection indication, the classification module 144 receives a second text input from the user interface module 152. In some embodiments, the classification module 144 receives the second text input with the rejection indication. The classification module 144 applies the filtering LLM to the text input and the second text input, and the filtering LLM produces a second filtering object, which the classification module 144 sends to the user interface module 152 for display. If the classification module 144 receives another rejection indication, the classification module 144 may repeat the process by applying the filtering LLM to the previous text inputs and newest text input and presenting the resulting filtering objects until the classification module 144 receives an acceptance indication. For each filtering object, the classification module 144 may label the filtering object with the text input(s) used by the filtering LLM to generate the filtering object and an associated acceptance or rejection indication and store the labeled filtering objects as filter training data in the model store 156.

The training module 146 may initially train the filtering LLM to generate filtering objects. The training module may use filtering objects labeled with text inputs as filter training data for the filtering LLM. The filtering objects may have been manually labeled by an operator or may have been generated and labeled using a machine learning model. During training, the filtering LLM develops an understanding of language structure and context in relation to filtering objects. To optimize the filtering LLM, the training module 146 may also tune the filtering LLM using the filter training data stored in the model store 156. Tuning the filtering LLM on the filter training data allows the filtering LLM to develop a deeper understanding of what users request for filtering objects via text, given the indications of user acceptance or rejection. The training module 146 may tune the filtering LLM every time new filter training data is stored in the model store 156, at set time intervals, in response to request from an operator, and the like.

The user interface module 152 receives requests to present media content items via one or more user interfaces (henceforth referred to as a user interface, for simplicity) and presents the media content items via the user interface. The user interface module 152 receives indications of user interactions with one or more interactive elements presented at the user interface. The interactive elements may include a text box (or other interactive element) configured to receive text inputs from a user. In response to receiving a text input in relation to a presented media content item, the user interface module 152 sends the text input to the classification module 144.

The user interface module 152 receives a filtering object that corresponds to the text input from the classification module 144. The user interface module 152 creates a graphic object that represents the filtering object. For example, the graphic object may be a box overlaid with the JSON or SQL representation of the filtering criteria or a pseudocode representation of the filtering criteria. The user interface module 152 transmits the graphic object for display via the user interface. In some embodiments, the user interface module 152 sends multiple graphic objects representing the filtering object for display via different portions of the user interface. Examples of graphic objects representing a filtering object are further described in relation to FIG. 2.

The user interface module 152 also transmits interactive elements related to the filtering object to the user interface for display. One or more interactive elements may be configured to receive user interactions indicative of whether a user approves of or rejects the filtering object. The user interface module 152 sends indications of acceptance or rejection sent via the interactive elements to the classification module 144. In some embodiments, the user interface module 152 may receive interactions with the graphic object(s) representing the filtering object, where these interactions are indicative of modifications to the filtering object as made by a user. For example, a user may move a graphic object representing a first filtering object relative to a graphic object representing a second filtering object to indicate that the user wants to change the application order for the first filtering object relative to the application order of the second filtering object. In another example, a user may alter a number included in the graphic object representing the filtering object to change a confidence score associated with the filtering object.

The user interface module 152 may receive a new text input related to the graphic object representing a filtering object. The text input may be indicative of a user's rejection of the filtering object and further describe the filtering object that the user wants. The user interface module 152 may send the new text input to the classification module 144. The user interface module 152 may receive a new filtering object for presentation at the user interface from the classification module 144. In some embodiments, the user interface module 152 transmits a new graphic object representing the new filtering object to the user interface for display and causes the user interface to stop displaying the graphic object representing the previous filtering object. In some embodiments, the user interface module 152 causes the user interface to display the graphic object representing the new filtering object along with any graphic objects representing previously rejected filtering criteria.

The user interface module 152 receives the filtered set of detected visual features and causes the user interface to display each of the filtered set of detected visual features. The user interface module 152 may cause the user interface to present the filtered set along with a graphic object representing the filtering object or in response to receiving an acceptance indication from the user interface. The user interface module 152 may cause the user interface to present each detected visual feature in the filtered set in conjunction with a frame of the media content item that includes the detected visual feature. In some embodiments, the user interface module 152 cause the user interface to present each frame associated with a visual feature of the filtered set only once, such that frames depicting more than one of the visual features is not presented multiple times.

The user interface module 152 may cause the user interface to highlight the visual feature within the visual feature's associated frame(s). The visual feature may be highlighted by overlaying a geometric shape (such as a box or circle) over the visual feature, labeling the visual feature with text describing the visual feature (e.g., what object, characteristic, or action is shows), outlining the visual feature within the frame, removing color or applying a visual editing technique (e.g., reducing brightness, increasing shadow, etc.) to everything in the frame other than the visual feature, and the like.

The modification module 148 modifies media content based on inputs to a user interface. In various embodiments, the modification module 148 modifies media content items according to a user's specification. The user may upload the set of media content items to the media detection system 140. Alternatively, the user may browse media content items stored in the media detection system 140 and select from among the browsed media content items. Via the one or more user interfaces, the user can also enter text inputs describing modifications the user wants for one or more media content items.

The modification module 148 receives a media content item specified by a user from the user interface module 152. The modification module 148 receives a text input from the user interface module 152 in association with the media content item. The text input is a textual description of a modification the user wants for the media content item. The modification module 148 inputs the text input to an extraction LLM. The extraction LLM is a language model that employs deep learning techniques to understand text inputs and generate modification criteria based on user intents determined from the text inputs. The extraction LLM is stored in the model store 156 and may be trained by the training module 146, as described below.

The modification module 148 receives modification criteria from the extraction LLM. The modification criteria describe how the user wants the visual features or properties of the media content item to be changed. Examples of modifications include highlighting visual features, adjusting brightness or contrast, resizing or cropping one or more frames, zooming in or out in one or more frames, adding metadata, overlaying additional media content items or graphic objects, removing frames, removing graphic objects, visual features, or other content, applying filters or effects, changing a color scheme, adding or removing visual features, or otherwise altering the media content item to conform to the user's intent described in the text input.

The modification module 148 creates a modification object representing the modification criteria. The modification object is used to modify the media content to meet the modification criteria. The modification object may include a JavaScript Object Notation (JSON) or Structured Query Language (SQL) representation of the modification criteria. For example, the modification object may include the modification criteria textually described in JSON or SQL.

In some embodiments, the modification object may include a simplified version of the JSON or SQL representation. For example, a simplified version may be a pseudocode (or "in layman's terms") version of the representation. In some embodiments, the modification object may be associated with an application order. The modification module 148 sends the modification object to the user interface module 152 and applies the modification object to the media content item to generate a modified media content item. The modification module 148 sends the modified media content item to the user interface module 152 for presentation.

The application order indicates where an ordered list of modification objects the modification object should be located, such that the modification object is applied to the media content item after modification objects located earlier in the ordered list but before modification objects later in the ordered list. In some embodiments, the modification module 148 orders the modification objects based on time of generation—e.g., the modification object generated first would be first on the ordered list, the modification object generated second would be second on the ordered list, etc. In some embodiments, modifications objects in the ordered list each depend on modification objects ordered before in the ordered list. For example, a second modification object may depend on a first modification object, but the first modification object does not dependent on the second modification object since it is earlier in the ordered list.

The modification module 148 receives approval and rejection indications from the user interface module 152 in association to the modification object. Each approval indication denotes that the user found modification object to match their intent described by the text input. Each rejection indication denotes that the user found that the modification object does not match their intent described in the text input. The modification module 148 labels the modification object with the text input and approval or rejection indication and stores the labeled modification object as modification training data in the model store 156.

The modification module 148 receives removal indications from the user interface module 152. A removal indication denotes that a user indicated to not apply a modification object to the media content item. The modification module 148 undoes the modifications made to the media content item. In some embodiments, the modification module 148 inputs the modification criteria associated with the modification object the extraction LLM along with an indication to create a new modification object that undoes the modifications requested in the modification criteria and applies the new modification criteria to the media content item. In some embodiments, the modification module 148 undoes modifications made based on subsequent modification objects that dependent on the modification object. For example, the modification module 148 may receive a removal indication for the modification object, which may be second in an ordered list of modification objects. The modification module 148 undoes modifications based on the modification object and a modification object that is first in the ordered list to create the new modification object. The modification module 148 sends the new modification to the user interface module 152.

The training module 146 may initially train the extraction LLM to generate modification criteria. The training module may use modification criteria labeled with text inputs as modification training data for the extraction LLM. The modification criteria may have been manually labeled by an operator or may have been generated and labeled using a machine learning model. During training, the extraction LLM develops an understanding of language structure and context in relation to modification criteria. To optimize the extraction LLM, the training module 146 may also tune the extraction LLM using the modification training data stored in the model store 156. Tuning the extraction LLM on the modification training data allows the extraction LLM to develop a deeper understanding of what users request for media content modifications via text, given the indications of user approval or rejection. The training module 146 may tune the extraction LLM every time new modification training data is stored in the model store 156, at set time intervals, in response to request from an operator, and the like.

The user interface module 152 receives requests to present media content items via one or more user interfaces (henceforth referred to as a user interface, for simplicity) and presents the media content items via the user interface. The user interface module 152 receives indications of user interactions with one or more interactive elements presented at the user interface. The interactive elements may include a text box (or other interactive element) configured to receive text inputs from a user. In response to receiving a text input in relation to a presented media content item, the user interface module 152 sends the text input to the modification module 148.

The user interface module 152 receives a modification object that corresponds to the text input from the modification module 148. The user interface module 152 creates a graphic object that represents the modification object. For example, the graphic object may be a box overlaid with the JSON or SQL representation of the modification criteria or a pseudocode representation of the modification criteria. The user interface module 152 transmits the graphic object for display via the user interface. In some embodiments, the user interface module 152 sends multiple graphic objects representing the modification object for display via different portions of the user interface. The user interface module 152 may cause the user interface to display the modification object relative to other modification objects based on its application order. For example, the user interface module 152 may cause the user interface to show the graphic objects of each modification object in order of the ordered list, forming a "pipeline" of graphic objects. Examples of graphic objects representing modification objects in a user interface are further described in relation to FIGS. 3A-C.

The user interface module 152 may also cause the user interface to display all or a portion of the media content item as modified by the modification object. The user interface may tie the media content item to an interactive element that allows a user to navigate between frames of the media content item. For example, the interaction element may be a slider that a user can interact with to horizontally scroll through frames of the media content item. In some embodiments, the user interface also displays metadata associated with the media content item, such as timestamps, geolocation coordinates, source, resolution, etc.

The user interface module 152 also transmits interactive elements related to the modification object to the user interface for display. One or more interactive elements may be configured to receive user interactions indicative of whether a user approves of or rejects the modification object. The user interface module 152 sends indications of approval or rejection sent via the interactive elements to the modification module 148. The graphic object or other interactive elements may receive interactions indicative of the user's desire to remove the modification object from the pipeline. In response to such interaction(s), the user interface module 152 sends a removal indication associated with the modification object to the modification module 148.

The user interface module 152 may receive a new text input related to the graphic object representing a modification object. The text input may be indicative of a user's desire to include a next modification object dependent on the modification object and describe modifications that the user wants to make to the modified media content item. The user interface module 152 may send the new text input to the modification module 148. The user interface module 152 may receive a new modification object for presentation at the user interface from the modification module 148. The user interface module 152 may transmit a new graphic object representing the new modification object to the user interface for display in the pipeline.

The identification module 150 determines modifications for media content based on outputs from an instance model. In various embodiments, the identification module 150 modifies media content items according to a user's specification. The user may upload the set of media content items to the media detection system 140. Alternatively, the user may browse media content items stored in the media detection system 140 and select from among the browsed media content items. Via the one or more user interfaces, the user can also enter text inputs describing modifications the user wants for one or more media content items.

The identification module 150 receives a media content item specified by a user from the user interface module 152. The identification module 150 receives a text input from the user interface module 152 in association with the media content item. The text input is a textual description of one or more visual features a user wants to detect within the media content item. The modification module 148 inputs the text input to a target LLM. The target LLM is a language model that employs deep learning techniques to understand text inputs and identify target objects. A target object is an identifier of a particular visual feature described by a text input. The target LLM is stored in the model store 156 and may be trained by the training module 146, as described below.

The identification module 150 receives a target object from the target LLM and creates a prompt with the target object to input to an instance model. The prompt includes the target object and media content item and may include a sensitivity measure associated with the target object. The sensitivity measure may be described in the text input and output from the target LLM or may be received from the user interface module 152. The identification module 150 inputs the prompt to the instance model.

The instance model is a neural network configured to identify an input target object in an input media content item. For example, the instance model may be a set of interconnected nodes, each configured to operate a small specific task such that the nodes together may identify instances of target objects. The nodes may be connected across various layers and the strength of the connections to one another (e.g., weights) may be refined during training of the instance model. Examples of neural networks include convolutional neural networks and recurrent neural networks. The instance model detects whether the target object is in the media content item and may detect multiple instances of the target object in the media content item. The identification module 150 receives the identified target object instances from the neural network. The identified target object instances may each be associated with location data including a frame and pixel coordinates describing the location of the respective identified target object instance in the media content item. The identification module 150 sends the identified target instances to the user interface module 152 for presentation to the user.

In some embodiments, the identification module 150 receives a sensitivity measure related to the text input. The sensitivity measure may be parsed from the text input by the target LLM or may be received from the user interface module 152 in association with the text input and/or media content item. The sensitivity measure represents reflects the instance model's ability to correctly classify or recognize different target objects within a media content item. The relationship between inputs and outputs in the instance model is learned during its training process, where it adjusts its weights and biases over several iterations to minimize its error. Altering the sensitivity measure of the instance model directly influences the accuracy of its target object identification. For example, the instance model may alter its architecture (e.g., the number of layers and nodes), the types of activation functions used, the learning rate, and the initial weights and biases to correspond to the sensitivity measure.

A high sensitivity measure may cause the instance model to be highly responsive to slight variations in prompts and more capable of correctly identifying fine-grained details or distinctions between target objects and other visual features. A low sensitivity may result in the instance model selecting target objects in the media content item with less regard to finer details and nuances between target objects and other visual features. The instance model may thus identify more target objects in the medica content item than when the instance model uses a high sensitivity measure. The identification module 150 may include the sensitivity measure in the prompt for the instance model, such that the instance model identifies target objects based on the sensitivity measure.

The identification module 150 may receive feedback from the user interface module 152. The feedback may be one or more of approval of the target instances, rejection of the target instances, modification of the target instances, modification of the sensitivity measure, or the like. The identification module 150 creates a new prompt incorporating the feedback into the old prompt. For example, the new prompt may include the feedback along with the old prompt or may include the feedback in place of corresponding portions of the old prompt. The identification module 150 inputs the new prompt to the instance model and sends the output of the instance model to the user interface module 152. The identification module 150 may repeat this process upon receiving feedback or new text inputs from the user interface module 152.

The user interface module 152 receives requests to present media content items via one or more user interfaces (henceforth referred to as a user interface, for simplicity) and presents the media content items via the user interface. The user interface module 152 receives indications of user interactions with one or more interactive elements presented at the user interface. The interactive elements may include a text box (or other interactive element) configured to receive text inputs from a user. In response to receiving a text input describing a target object for a presented media content item, the user interface module 152 sends the text input to the identification module 150.

The user interface module 152 receives target objects instances that correspond to the text input from the identification module 150. The user interface module 152 causes the user interface the highlight the target object instances in the media content item. In particular, the user interface module 152 may locate each target object instance based on the corresponding location data and highlight the target object instance by one or more of overlaying a shape at the target object instance, outlining the target object instance, labeling the target object instance with text describing the target object, etc.

In some embodiments, the identification module 150 receives highlighting criteria related to the target object instances. The highlighting criteria may be parsed from the text input by the target LLM or may be received from the user interface module 152 in association with the highlighted target object instances. The highlighting criteria represents conditions selected by the user that indicate what to highlight within the media content item. For example, the highlighting criteria may indicate how to highlight target objects in the media content item (e.g., overlay with box, outline target object, etc.), other visual features to filter out of the media content item, and which highlights to show (e.g., those for target objects corresponding to a first text input vs. a second text input, those that received user feedback, etc.). In some embodiments, the identification module 150 includes the highlighting criteria in the prompt for the instance model, such that the instance model locates target object instances to highlight that meet the highlighting criteria.

The training module 146 may initially train the target LLM to detect target objects requested within text inputs. The training module may use target objects labeled with text inputs as target training data for the target LLM. The target objects may have been manually labeled by an operator or may have been generated and labeled using a machine learning model. During training, the target LLM develops an understanding of language structure and context in relation to target objects. To optimize the target LLM, the training module 146 may also tune the target LLM using the target training data stored in the model store 156. Tuning the target LLM on the target training data allows the target LLM to develop a deeper understanding of how users request target objects via text. The training module 146 may tune the target LLM every time new target training data is stored in the model store 156, at set time intervals, in response to request from an operator, and the like.

The training module 146 may also use the target training data to train the instance model. In particular, the training module 146 may input media content items labeled with target object instances within the medica content, approval or rejection of each highlight of the target object instances within the media content items, and modifications to highlights made by users. This target training data may be labeled manually or via a machine learning model. Training the instance model using the target training data allows the instance model to develop a deeper understanding of what different target objects look like within media content items. The training module 146 may also tune the weights of the instance model using new target training data. The training module 146 may tune the instance model every time new target training data is stored in the model store 156, at set time intervals, in response to request from an operator, and the like.

The user interface module 152 also transmits interactive elements related to the highlighted media content item to the user interface for display. One or more interactive elements may be configured to receive user interactions indicative highlighting criteria or of whether a user approves of or rejects one or more of the highlights. The highlights themselves may also be configured as interactive elements such that a user can add a highlight to indicate where a target object instance is within the media content item or move a highlight to better reflect a location of a target object instance. The user interface module 152 sends selected highlighting criteria, indications of approval or rejection, and interactions with the highlights to the identification module 150. The user interface may label the highlighted media content item with the target object, indications of approval or rejection, and interactions with the highlights and store the labeled media content item as target training data in the model store 156.

Example User Interfaces

Figure 2:
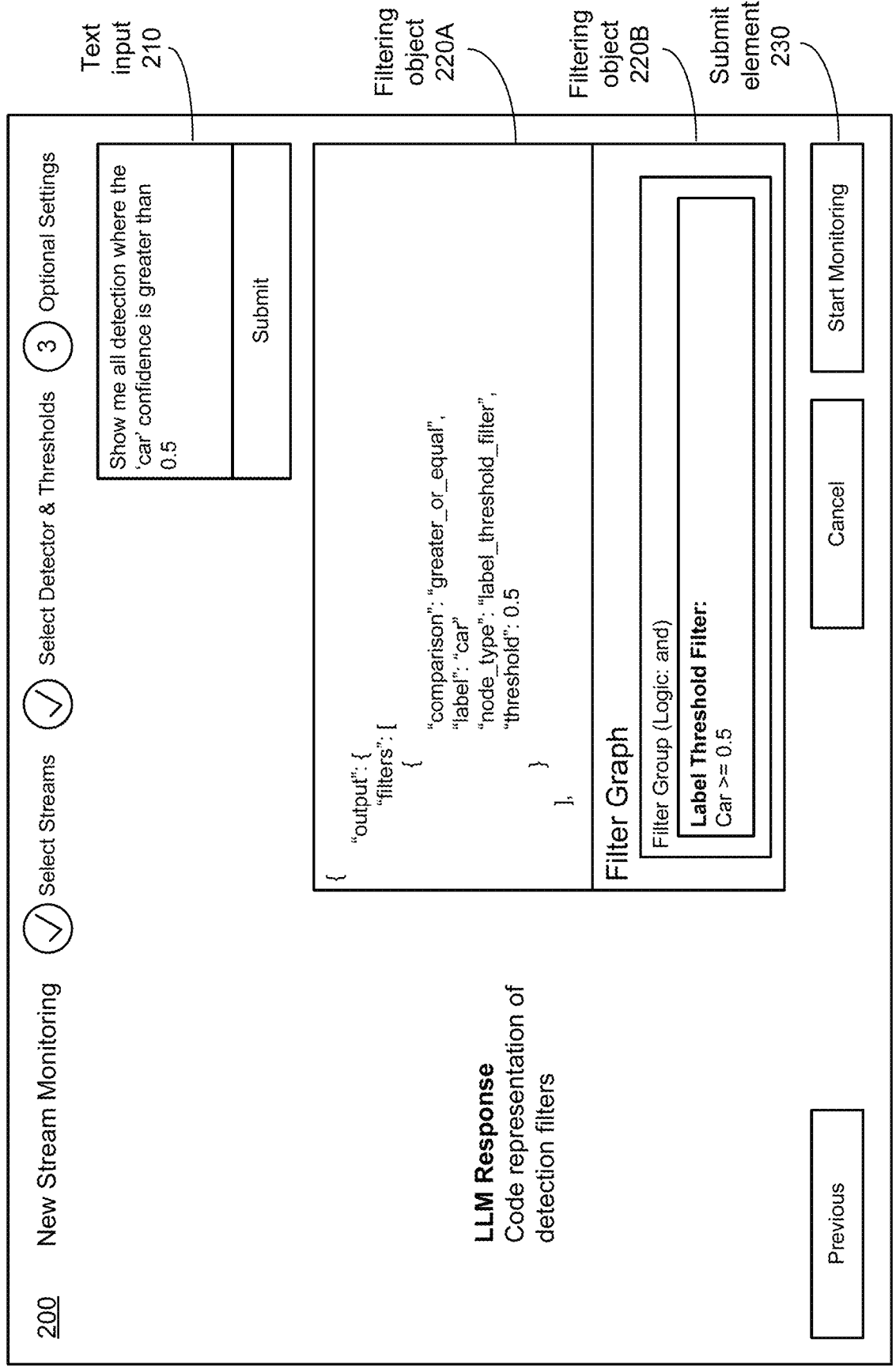
FIG. 2 is an example user interface for filtering detected objects, according to one embodiment.

FIG. 2 is an example user interface 200 for filtering detected objects, according to one embodiment. In some embodiments, the user interface 200 may include additional or alternative elements to those shown in FIG. 2.

The user interface 200 includes one or more interactive elements configured to receive a text input 200. Text inputs are sent to the classification module 144, which may produce one or more filtering objects to be presented at the user interface 200. A filtering object 220A may be pseudocode version of a representation of filtering criteria identified in the text input 210. A filtering object 220B may also be represented as a filter graph that represents the filtering criteria in layers of boxes (or other shapes), where the layers indicate an order that the filtering criteria represented by each box is applied. A user may interact with the placement of or text within the filtering objects 220 to modify the filtering objects and accept the filtering objects as-is or after modification by interacting with the submit element 230, which causes the user interface module 152 to receive an indication of acceptance. The user may also interact with the user interface by adding a new text input or interacting with a rejection element (not shown) to cause the user interface module 152 to receive a rejection indication.

Figure 3A:
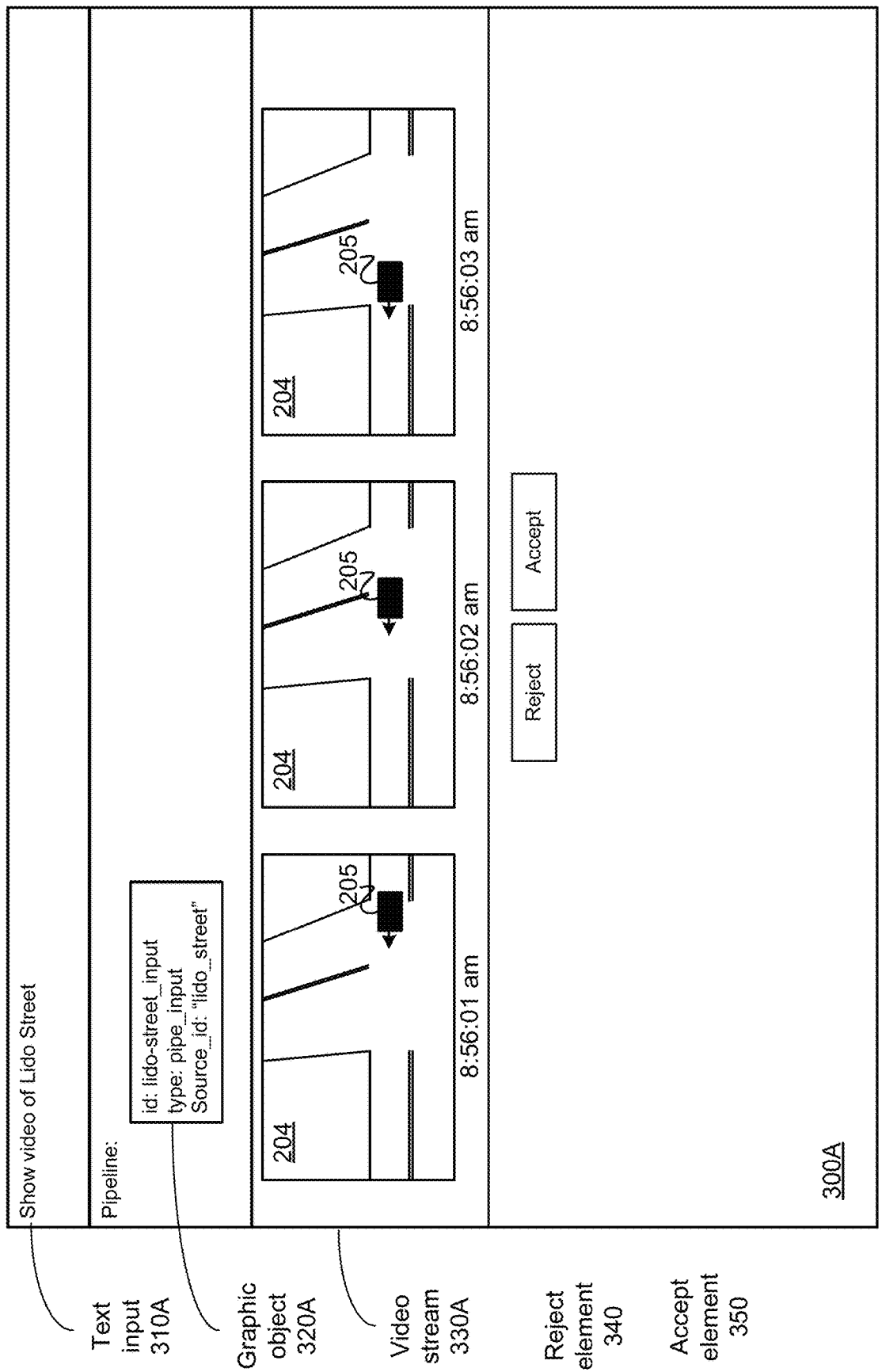
FIGS. 3A through 3C illustrate an example user interface for modifying video streams based on text inputs, according to various embodiments.
Figure 3B:
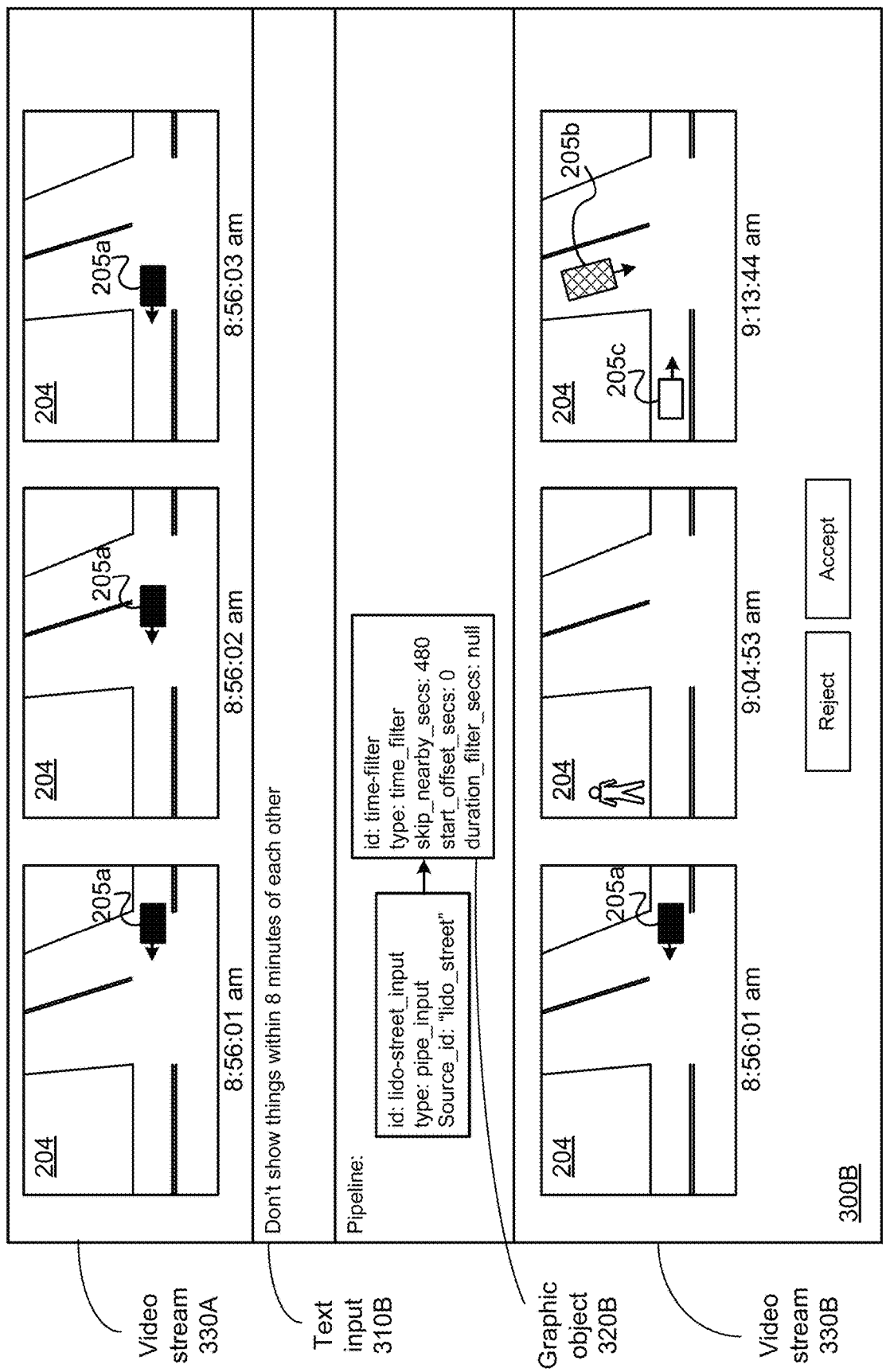
Figure 3C:
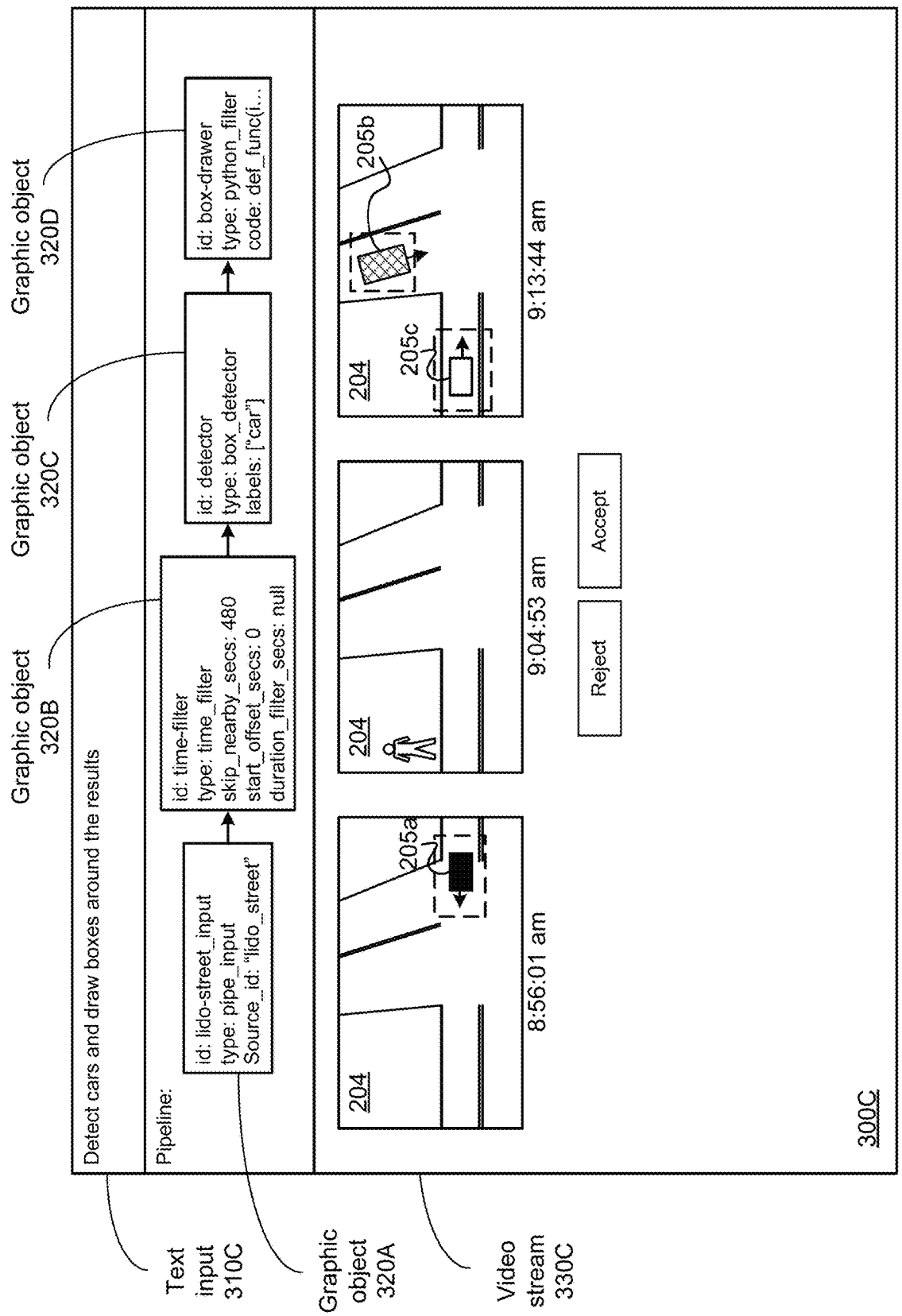

FIGS. 3A through 3C illustrate example user interfaces 300 for modifying video streams 330 based on text inputs, according to various embodiments. In some embodiments, the user interface 200 may include additional or alternative elements to those shown in FIGS. 3A-3C.

The user interface 300A of FIG. 3A includes a text input 310A requesting a first video stream 330A of Lido Street. The user interface module 152 receives the text input 310A from the user interface 300A and creates a first graphic object 320A that represents accessing the video of Lido Street. The first graphic object 320A is included in a pipeline that indicates an order of application criteria represented by the graphic object(s) in the pipeline. The user interface 300A also includes a first video stream 330A of Lido Street, which may be represented in the user interface 300A as frames from the first video stream 330A. The reject element 340 is configured to receive an interaction that indicates that the user rejected the first video stream 330A, and the accept element 350 is configured to receive an interaction that indicates that the user accepted (e.g., approved of) the first video stream 330A.

FIG. 3B includes a text input requesting that the first video stream 330A be modified to not show objects (e.g., cars, people, etc.) videoed within eight minutes of each other. The user interface depicts a second graphic object 320B corresponding to text input 310B after first graphic object 320A that corresponds to text input 320A from FIG. 3A. The ordering of the graphic objects 320 in the pipeline indicates that first graphic object 320A is applied and the second graphic object 320B is applied after the first graphic object 320A. The user interface 300B includes a second video stream 330B, which is a modified version of the first video stream 330A, where the modification corresponds to modification criteria described by the second graphic object 320B. The second video stream 330B is presented as frames in the user interface 300B. The frames selected for presentation meet the modification criteria from second graphic object 320B (e.g., each frame is at least eight minutes apart and shows a different object than the frame before). For example, the first frame includes a car, while the second frame includes a person.

FIG. 3C depicts a user interface 300C with a text input 310C requesting that the second video stream 330B be modified to detect cars and include boxes around the detected cars. In this example, the text input 310C corresponds to two graphic objects 320: a third graphic object 320C and a fourth graphic object 320D. The third graphic object 320C represents detecting cars in the second video stream 330B, and the fourth graphic object 320D represents overlaying boxes around the cars in the video stream 330B, which results in a third video stream 330C. Here, the frames are at least eight minutes apart and show different objects, as required by the second graphic object 320B, because the second graphic object 320B occurs earlier in the pipeline than the third graphic object 320C and fourth graphic object 320D.

A user may interact with the graphic objects 320 presented in the user interface 300C to change the modification criteria applied by the graphic objects 320 (e.g., by altering the text associated with the graphic object) or to remove graphic objects 320. If a user removes the fourth graphic object 320D, the user interface 300C may update to remove the dashed boxes shown around the cars in the third video stream 330C. If a user removes the second graphic object 320B, the user interface 300C may update to remove the third graphic object 320C and fourth graphic object 320D due to their dependence (e.g., being ordered later) in the pipeline from the second graphic object 320B. The user interface 300C may also update to depict the first video stream 330A to correspond to the graphic first object 320A still in the pipeline.

Figure 4A:
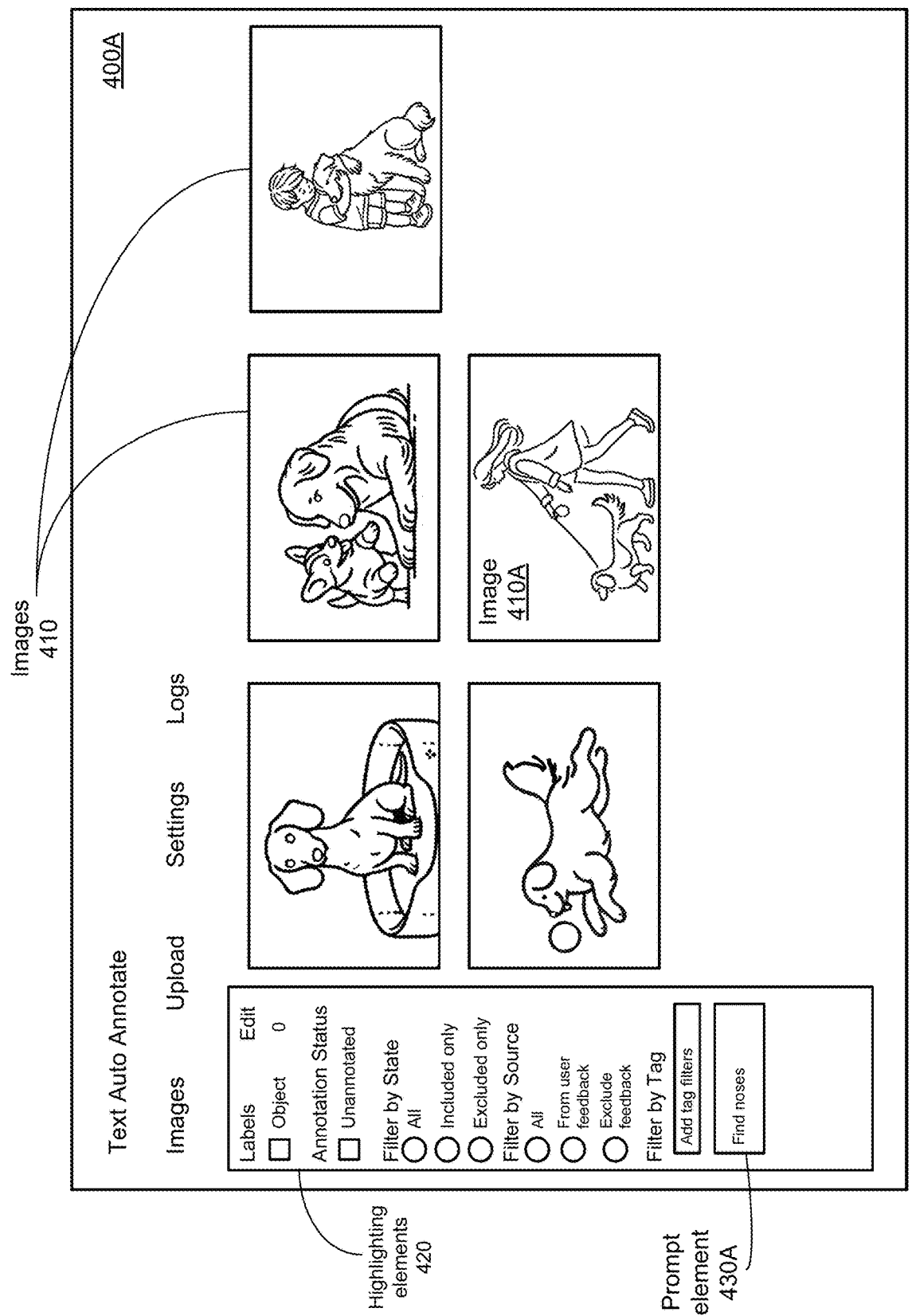
FIGS. 4A through 4B illustrate an example user interface for highlighting instances of a target object, according to one embodiment.
Figure 4B:
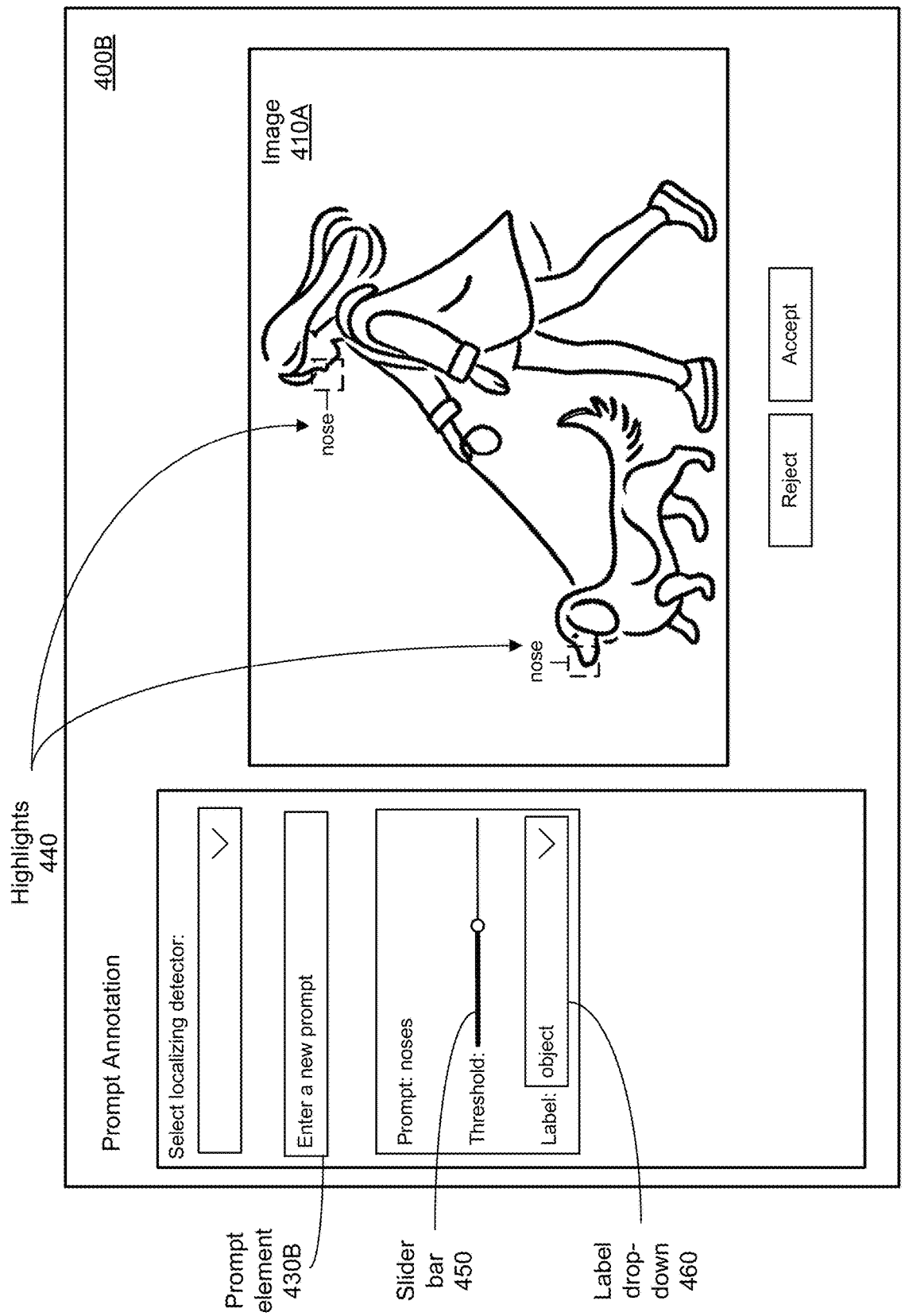

FIGS. 4A through 4B illustrate example user interfaces for highlighting instances of a target object, according to one embodiment. In some embodiments, the user interface 300 may include additional or alternative elements to those shown in FIGS. 4A-4B.

In FIG. 4A, the user interface 400A includes one or more images 410 uploaded by a user and highlighting elements 420 that allow the user to select highlighting criteria to indicate what to highlight within the images 410. For example, the highlighting criteria may indicate whether to include labels or annotations in with the highlights, whether to include highlights determined by the identification module 150 and/or added by the user via the user interface 400A, etc. The user interface 400A includes a prompt element 430A that receives text inputs indicative of one or more target objects the user wants to be identified in the images 410. In this example, the prompt element includes text indicating to "Find noses" in the images 410.

In FIG. 4B, the user interface 400A displays one of the images 410A with target object instances highlighted 440. Here, the target object was a "nose," and the target object instances are noses of a girl and a dog depicted in the images 410. Each highlight 440 is a dashed box that is placed such that a corresponding nose is at its center and includes a label of what the target object is (e.g., "nose"). The user interface 400A includes another prompt element 430B that can receive a new text input and a slider bar configured to receive a sensitivity measure that reflects a localizing detector's (e.g., the instance model's) ability to correctly classify or recognize different target objects. A higher sensitivity causes the localizing detector to be more selective about what qualifies as a nose in the image data, and a lower sensitivity measure causes the localizing detector to be less selective about what qualifies as a nose in the image data. For example, a higher sensitivity measure may cause only the girl's nose to be detected, whereas a lower sensitivity measure may cause the end of the dog's paw to be mistakenly detected as a nose. The user interface 400B also include a label drop-down 460 configured to receive a selection about how to label the highlights 440.

Example Processes

Figure 5:
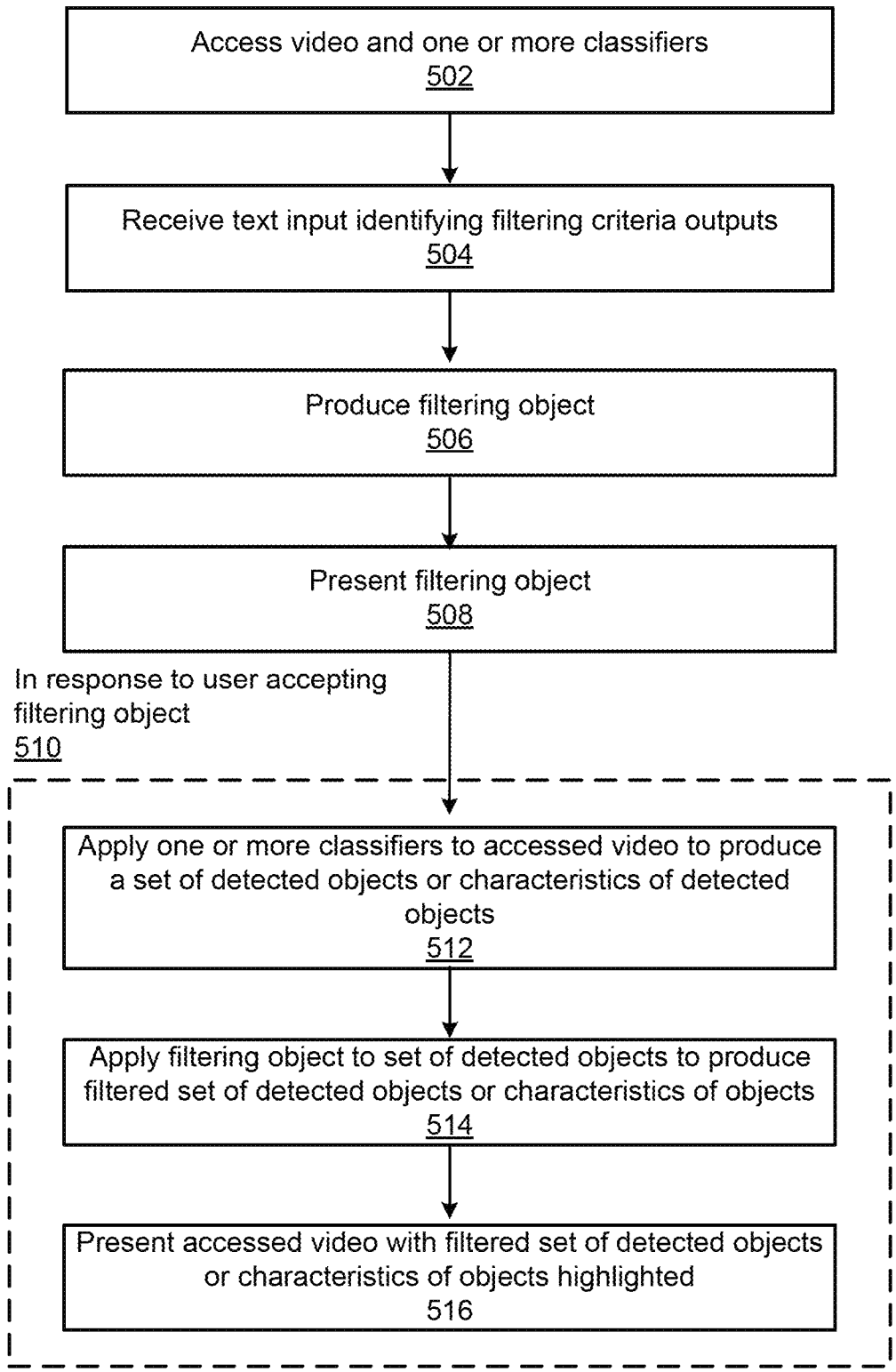
FIG. 5 is a flowchart of an example process for presenting video with highlighted portions, according to one embodiment.

FIG. 5 is a flowchart of an example process 500 for presenting video with highlighted portions, according to one embodiment. Though described herein in relation to the media detection system 140, other modules depicted in FIG. 1 may perform the process 500. Further, the process 500 may include additional or alternative steps to those shown in FIG. 1.

The media detection system 140 accesses a video (or another media content item) and one or more classifiers. The classifiers can detect an object or characteristic of an object when applied to the video. The media detection system 140 receives a text input from a user interface. The text input identifies one or more filtering criteria for outputs of the classifiers. In some embodiments, the filtering criteria specify time or space constraints for the outputs of the classifiers or a relationship between two or more detected objects or characteristics of objects in the video. The media detection system 140 inputs the text input to a filtering LLM, which produces a filtering object. The filtering object may a JSON or SQL representation of the filtering criteria. In some embodiments, the media detection system 140 simplifies the JSON or SQL representation to be a textual description of what the filtering object does. The media detection system 140 presents the filtering object at the user interface such that the user interface receive input from a user modifying the filtering object or accept the filtering object.

In response to the user accepting (e.g., approving) the filtering object, the media detection system 140 applies the one or more classifiers to the video. The classifiers produce a set of detected objects or characteristics of objects in the video. In some embodiments, the set of detected objects or characteristics include includes one or more actions taken by one or more objects in the video. The media detection system 140 applies the filtering object to the produced set of detected objects or characteristics of objects by removing a subset of the set of detected objects or characteristics of objects that do not satisfy the one or more filtering criteria. The media detection system 140 presents the video with the filtered set of detected objects or characteristics of objects highlighted within the video.

In some embodiments, the media detection system 140 inputs a modification sent via the user interface to the filtering LLM in response to receiving the modification of a filtering object. The filtering LLM produces a second filtering object, and the media detection system 140 presents the second filtering object via the user interface.

In some embodiments, in response to receiving an indication from the user interface that the filtering object was rejected, the media detection system 140 receives a second text input via the user interface and inputs the text input and the second text input to the filtering LLM. The filtering LLM produces a second filtering object, and the media detection system 140 presents the second filtering object via the user interface. In some embodiments, the filtering LLM is tuned based on the second filtering object and second text input in response to receiving an acceptance of the second filtering object via the user interface.

In some embodiments, the media detection system 140 receives a second text input via the user interface. The second text input identifies new filtering criteria for outputs of the classifiers. The media detection system 140 inputs the second text input to the filtering LLM, which produces a second filtering object.

In some embodiments, the media detection system 140 applies the one or more classifiers prior to receiving the indication that the filtering object was accepted or rejected and presents the video with the filtered set of detected objects or characteristics of objects along with the filtering object for approval or rejection.

Figure 6:
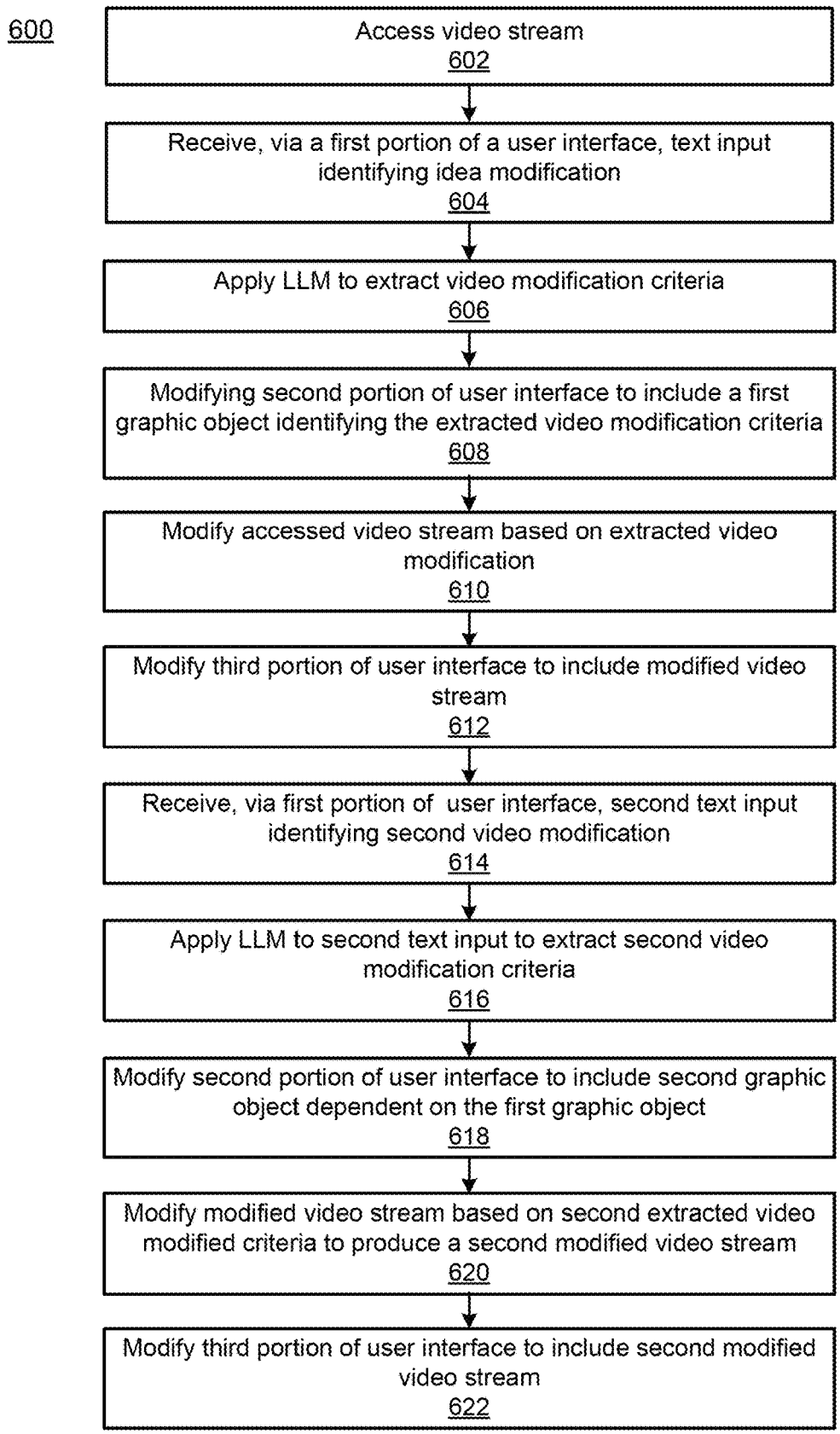
FIG. 6 is a flowchart of an example process for modifying a user interface based on text inputs, according to one or more embodiments.

FIG. 6 is a flowchart of an example process for modifying a user interface based on text inputs, according to one or more embodiments. Though described herein in relation to the media detection system 140, other modules depicted in FIG. 1 may perform the process 600. Further, the process 600 may include additional or alternative steps to those shown in FIG. 1.

The media detection system 140 accesses a video stream (or other media content item) and receives a text input from a first portion of a user interface. The text input identifies a video modification for the video stream. The media detection system 140 applies a modification LLM to the text input. The modification LLM extracts video modification criteria from the text input. The media detection system 140 modifies a second portion of the user interface to include a first graphic object identifying the extracted video modification criteria and modifies the video stream based on the extracted video modification criteria to produce a modified video stream. The media detection system 140 modifies a third portion of the user interface to include the modified video stream.

The media detection system 140 receives a second text input via the first portion of the user interface. The second text input identifies a second video modification for the modified video stream. The media detection system 140 applies the modification LLM to the second text input. The modification LLM extracts second video modification criteria. The media detection system 140 modifies the second portion of the user interface to include a second graphic object dependent on the first graphic object and identifying the second extracted video modification criteria. The media detection system 140 modifies the modified video stream based on the second extracted video modification criteria to produce a second modified video stream. In some embodiments, the media detection system modifies the accessed video stream by one or more of: adding metadata to the video stream, adding content to the video stream, removing frames from the video stream, removing content from the video stream, and zooming in during one or more frames of the video stream. The media detection system 140 modifies the third portion of the user interface to include the second modified video stream.

In some embodiments, the first graphic object and second graphic object form a pipeline of graphic objects representing modifications to the video stream. The pipeline may include one or more additional filtering graphic objects, and the media detection system 140 modifies the modified video stream based on additional extracted video modification criteria associated with each additional filtering graphic object. The media detection system 140 may present the pipeline via the user interface. In response to receiving an indication to remove the first graphic object from the pipeline, the media detection system 140 modifies the second modified video stream by undoing the modifications made based on the extracted video modification criteria and the second extracted video modification criteria to produce a third modified video stream. The media detection system 140 may modify the third portion of the user interface to include the third modified video stream.

In some embodiments, after presenting the pipeline with both the first and second graphic objects, the media detection system 140 may receive an indication to remove the second graphic object from the pipeline. In response, the media detection system 140 modifies the second modified video stream by undoing the modifications made based on the second extracted video modification criteria to produce a third modified video stream. The media detection system 140 may modify the third portion of the user interface to include the third modified video stream.

In some embodiments, the media detection system 140 may receive indications of approval or rejection of the modifications via the user interface. For example, a user may indicate disapproval of a modification by interacting with an interactive element displayed at the user interface. The media detection system 140 may tune the modification LLM based on the indications.

Figure 7:
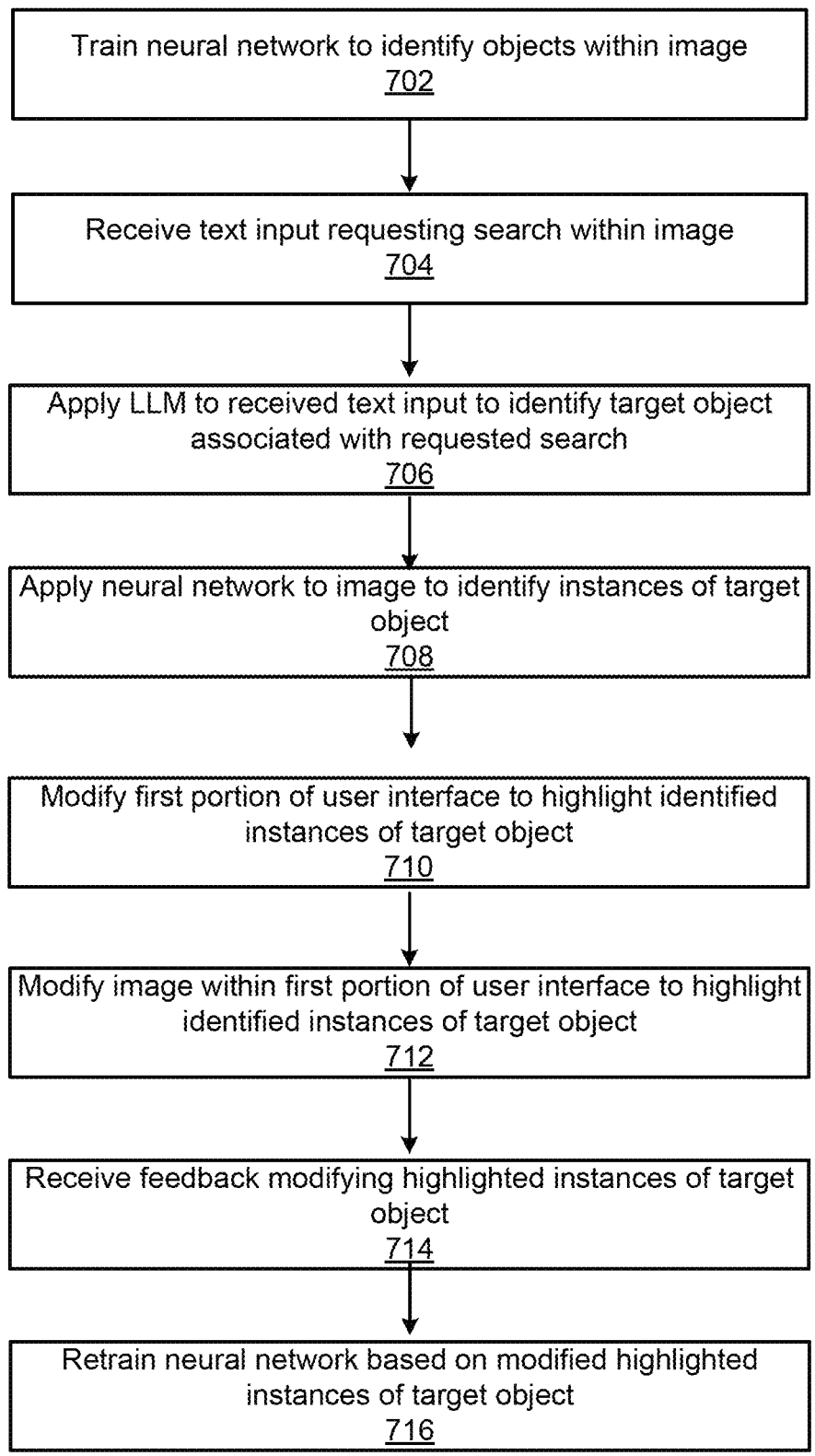
FIG. 7 is a flow chart of an example process for training a neural network based on modifications of highlighted instances presented at a user interface, according to one embodiment.

FIG. 7 is a flow chart of an example process for training a neural network based on modifications of highlighted instances presented at a user interface, according to one embodiment. Though described herein in relation to the media detection system 140, other modules depicted in FIG. 1 may perform the process 700. Further, the process 700 may include additional or alternative steps to those shown in FIG. 1.

The media detection system 140 trains a detection neural network to identify objects within an image (or other media content item). The media detection system 140 receives a text input requesting a search within the image. The media detection system 140 applies a search LLM to the text input. The search LLM identifies a target object associated with the requested search. The media detection system 140 applies the detection neural network to the image to identify instances of the target object. The media detection system 140 modifies a first portion of a user interface to include the image and modifies the image to highlight the identified instances of the target object. For example, the media detection system 140 may overlay portions of the image corresponding to instances of the target object with a geometric shape, such as a circle or box.

The media detection system 140 receives feedback via the user interface. The feedback modifies the highlighted instances of the target object within the user interface. The feedback may be a textual edit of a label overlaid on the image. In some embodiments, the feedback is an indication of approval of the modified image by a user of the user interface or an indication of disapproval of one or more highlighted instances of the target object. The media detection system 140 retrains the detection neural network based on the modified highlighted instances of the target object. In some embodiments, the media detection system 140 retrains the search LLM based on the feedback.

In some embodiments, the media detection system 140 receives an interaction with a slider bar presented at the user interface. The interaction is indicative of a confidence level for the neural network. In response to receiving the interaction, the media detection system 140 applies the detection neural network to the image to identify a new set of instances of the target object based on the confidence level. The media detection system 140 modifies the image within the first portion of the user interface to highlight the new set of identified instances of the target object.

Computer Architecture

Figure 8:
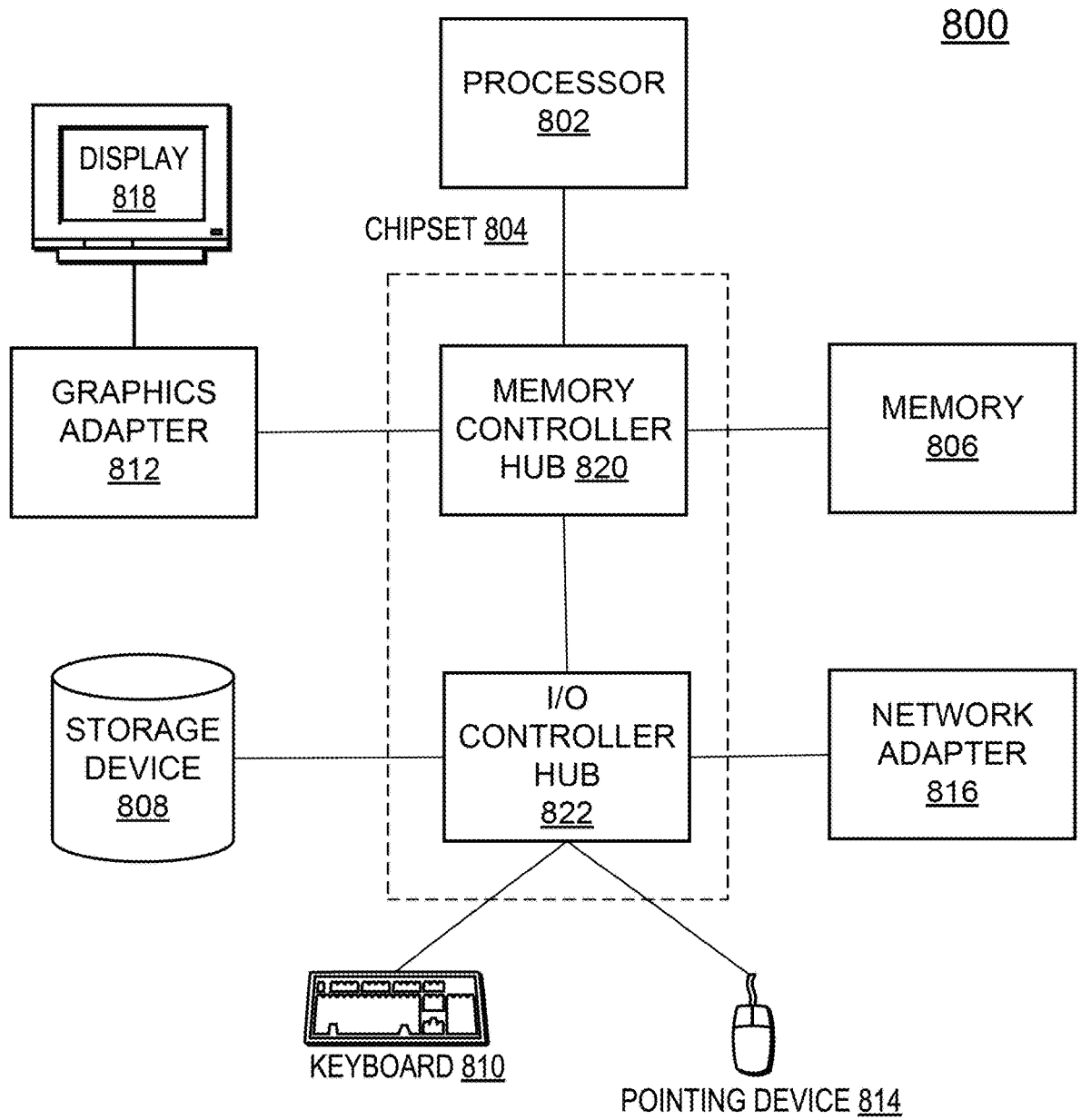
FIG. 8 is a high-level block diagram of a computer for implementing different entities illustrated in FIG. 1.

FIG. 8 is a high-level block diagram of a computer 800 for implementing different entities illustrated in FIG. 1. The computer 800 includes at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer system 800. The graphics adapter 812 displays images and other information on the display 818. The network adapter 816 couples the computer system 800 to the network 150.

As is known in the art, a computer 800 can have different and/or other components than those shown in FIG. 8. In addition, the computer 800 can lack certain illustrated components. For example, the computer acting as the online system 100 can be formed of multiple blade servers linked together into one or more distributed systems and lack components such as keyboards and displays. Moreover, the storage device 808 can be local and/or remote from the computer 800 (such as embodied within a storage area network (SAN)).

As is known in the art, the computer 800 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 806, and executed by the processor 802.

Alternative Embodiments

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative designs for a unified communication interface providing various communication services. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed:

1. A method comprising:
    accessing a video and one or more classifiers that when applied to the video can detect an object or characteristic of an object in the accessed video;
    receive a text input from a user identifying one or more filtering criteria for outputs of the classifiers;
    producing, using a large language model (LLM), a filtering object based on the text input;
    presenting the filtering object to the user in a user interface configured to receive interactions from the user that such that the user can modify the filtering object or accept the filtering object, wherein modifying the filtering object includes placing the filtering object before a second filtering object;
    in response to the user accepting the filtering object:
        applying the one or more classifiers to the accessed video to produce a set of detected objects or characteristics of objects in the accessed video;
        applying the filtering object to the produced set of detected objects or characteristics of objects to produce a first filtered set of detected objects or characteristics of objects by removing a subset of the set of detected objects or characteristics of objects that do not satisfy the one or more filtering criteria;
        responsive to producing the filtered set of detected objects or characteristics of objects, applying the second filtering object to the first filtered set of detected objects or characteristics of objects to produce a second filtered set of detected objects or characteristics of objects by removing a second subset of the first filtered set of detected objects or characteristics of objects that do not satisfy one or more filtering criteria associated with the second filtering object; and
        presenting the accessed video with the filtered set of detected objects or characteristics of objects highlighted within the accessed video.

2. The method of claim 1, wherein the filtering criteria specify time or space constraints for the outputs.

3. The method of claim 1, wherein the filtering criteria specify a relationship between two or more detected objects or characteristics of the video.

4. The method of claim 1, further comprising:
    receiving a second text input from the user identifying a new filtering criteria for outputs of the classifiers;
    producing, using the LLM, the second filtering object based on the second text input; and
    presenting the second filtering object to the user.

5. The method of claim 1, wherein filtering object is a JavaScript Object Notation (JSON) or Structured Query Language (SQL) representation of the one or more filtering criteria.

6. The method of claim 1, wherein filtering object is a version of a JavaScript Object Notation (JSON) or Structured Query Language (SQL) representation of the one or more filtering criteria.

7. The method of claim 1, wherein the set of detected objects or characteristics of objects in the accessed video includes one or more actions taken by one or more objects in the accessed video.

8. The method of claim 1, further comprising:
    in response to receiving an indication that the user rejected the filtering object:
        receiving a second text input from a user;
        producing, using the LLM, a third filtering object based on the text input and the second text input; and
        presenting the third filtering object to the user.

9. The method of claim 8, wherein the LLM is tuned based on the third filtering object and second text input in response to the user accepting the third filtering object.

10. A non-transitory computer-readable storage medium storing instructions that, when executed, cause a processor to perform operations comprising:
    accessing a video and one or more classifiers that when applied to the video can detect an object or characteristic of an object in the accessed video;
    receive a text input from a user identifying one or more filtering criteria for outputs of the classifiers;
    producing, using an LLM, a filtering object based on the text input;
    presenting the filtering object to the user in a user interface configured to receive interactions from the user that such that the user can modify the filtering object or accept the filtering object, wherein modifying the filtering object includes placing the filtering object before a second filtering object;
    in response to the user accepting the filtering object:
        applying the one or more classifiers to the accessed video to produce a set of detected objects or characteristics of objects in the accessed video;
        applying the filtering object to the produced set of detected objects or characteristics of objects to produce a first filtered set of detected objects or characteristics of objects by removing a subset of the set of detected objects or characteristics of objects that do not satisfy the one or more filtering criteria;

responsive to producing the filtered set of detected objects or characteristics of objects, applying the second filtering object to the first filtered set of detected objects or characteristics of objects to produce a second filtered set of detected objects or characteristics of objects by removing a second subset of the first filtered set of detected objects or characteristics of objects that do not satisfy one or more filtering criteria associated with the second filtering object; and presenting the accessed video with the filtered set of detected objects or characteristics of objects highlighted within the accessed video.

11. The non-transitory computer-readable storage medium of claim 10, wherein the filtering criteria specify time or space constraints for the outputs.

12. The non-transitory computer-readable storage medium of claim 10, wherein the filtering criteria specify a relationship between two or more detected objects or characteristics of the video.

13. The non-transitory computer-readable storage medium of claim 10, the operations further comprising:
receiving a second text input from the user identifying a new filtering criteria for outputs of the classifiers;
producing, using the LLM, the second filtering object based on the second text input; and
presenting the second filtering object to the user.

14. The non-transitory computer-readable storage medium of claim 10, wherein filtering object is a JavaScript Object Notation (JSON) or Structured Query Language (SQL) representation of the one or more filtering criteria.

15. A system comprising:
a processor; and
a non-transitory computer-readable storage medium storing instructions that, when executed, cause the processor to perform operations comprising:
accessing a video and one or more classifiers that when applied to the video can detect an object or characteristic of an object in the accessed video;
receive a text input from a user identifying one or more filtering criteria for outputs of the classifiers;
producing, using an LLM, a filtering object based on the text input;
presenting the filtering object to the user in a user interface configured to receive interactions from the user that such that the user can modify the filtering object or accept the filtering object, wherein modifying the filtering object includes placing the filtering object before a second filtering object;
in response to the user accepting the filtering object:
applying the one or more classifiers to the accessed video to produce a set of detected objects or characteristics of objects in the accessed video;
applying the filtering object to the produced set of detected objects or characteristics of objects to produce a first filtered set of detected objects or characteristics of objects by removing a subset of the set of detected objects or characteristics of objects that do not satisfy the one or more filtering criteria;
responsive to producing the filtered set of detected objects or characteristics of objects, applying the second filtering object to the first filtered set of detected objects or characteristics of objects to produce a second filtered set of detected objects or characteristics of objects by removing a second subset of the first filtered set of detected objects or characteristics of objects that do not satisfy one or more filtering criteria associated with the second filtering object; and
presenting the accessed video with the filtered set of detected objects or characteristics of objects highlighted within the accessed video.

16. The system of claim 15, wherein the filtering criteria specify time or space constraints for the outputs.

17. The system of claim 15, wherein the filtering criteria specify a relationship between two or more detected objects or characteristics of the video.

18. The system of claim 15, the operations further comprising:
receiving a second text input from the user identifying a new filtering criteria for outputs of the classifiers;
producing, using the LLM, the second filtering object based on the second text input; and
presenting the second filtering object to the user.

19. The system of claim 15, wherein filtering object is a Javascript Object Notation (JSON) or Structured Query Language (SQL) representation of the one or more filtering criteria.

* * * * *